United States Patent
Zhang

(10) Patent No.: US 12,139,603 B2
(45) Date of Patent: Nov. 12, 2024

(54) POLYGLYCOLIDE COPOLYMER COMPOSITION AND PREPARATION THEREOF

(71) Applicant: Pujing Chemical Industry Co., Ltd., Shanghai (CN)

(72) Inventor: Xinzhou Zhang, Shanghai (CN)

(73) Assignee: Pujing Chemical Industry Co., Ltd., Shanghai (CN)

( * ) Notice: Subject to any disclaimer, the term of this patent is extended or adjusted under 35 U.S.C. 154(b) by 721 days.

(21) Appl. No.: 17/289,404

(22) PCT Filed: Oct. 29, 2018

(86) PCT No.: PCT/CN2018/112462
§ 371 (c)(1),
(2) Date: Apr. 28, 2021

(87) PCT Pub. No.: WO2020/087215
PCT Pub. Date: May 7, 2020

(65) Prior Publication Data
US 2022/0002539 A1   Jan. 6, 2022

(51) Int. Cl.
*C08L 67/04* (2006.01)
*B29B 9/02* (2006.01)
*C08K 3/34* (2006.01)
*C08K 7/06* (2006.01)
*C08K 7/14* (2006.01)
*C08L 77/10* (2006.01)

(52) U.S. Cl.
CPC ............... *C08L 67/04* (2013.01); *B29B 9/02* (2013.01); *C08K 3/346* (2013.01); *C08K 7/06* (2013.01); *C08K 7/14* (2013.01); *C08L 77/10* (2013.01)

(58) Field of Classification Search
CPC . C08L 67/04; C08L 77/10; B29B 9/02; C08K 3/346; C08K 7/06; C08K 7/14; C08K 3/013
USPC ........................................................ 524/495
See application file for complete search history.

(56) References Cited

U.S. PATENT DOCUMENTS

| | | | |
|---|---|---|---|
| 6,046,251 A | 4/2000 | Kawakami et al. | |
| 2003/0125508 A1 | 7/2003 | Yamane et al. | |
| 2009/0171039 A1 | 7/2009 | Sato et al. | |
| 2015/0247021 A1 | 9/2015 | Saigusa et al. | |
| 2021/0388154 A1* | 12/2021 | Zhang | C08K 7/14 |
| 2022/0010052 A1* | 1/2022 | Feng | C08G 18/73 |

FOREIGN PATENT DOCUMENTS

| | | |
|---|---|---|
| EP | 2045292 A1 | 4/2009 |
| EP | 2933086 A1 | 10/2015 |
| JP | 2001323056 A | 11/2001 |
| JP | 2011143709 A | 7/2011 |
| JP | 2015232113 A | 12/2015 |

OTHER PUBLICATIONS

1 Japan Patent Office, Notice of Reasons for Refusal, Application No. 2021-523976, Aug. 2, 2022, 14 pages.
Ding et al., "Synthesis and characterization of degradable electrically conducting copolymer of aniline pentamer and polyglycolide," European Polymer Journal, vol. 43, Issue 10, Oct. 2007, pp. 4244-4252.
Extended Search Report from counterpart European Application No. 18938851 dated May 17, 2022, 8 pp.
PCT International Search Report and Written Opinion, PCT/CN2018/112462, Jul. 5, 2019, 10 pages.

* cited by examiner

*Primary Examiner* — Hannah J Pak
(74) *Attorney, Agent, or Firm* — Quarles & Brady LLP

(57) ABSTRACT

A composition comprises a polyglycolide or a polyglycolide copolymer and a filler. The polyglycolide is prepared from glycolide by ring-opening polymerization. The composition may have a tensile modulus greater than 5,800 MPa. The polyglycolide copolymer may have a weight-average molecular weight (Mw) in the range of 10,000-1,000,000 and a ratio of a weight-average molecular weight to a number-average molecular weight (Mw/Mn) in the range of 1.0 to 10.0. The polyglycolide copolymer may have a melt index (MFR) in the range of 0.1 to 1000 g/10 min. Also provided is a process for preparing the composition.

19 Claims, No Drawings

POLYGLYCOLIDE COPOLYMER COMPOSITION AND PREPARATION THEREOF

CROSS-REFERENCE TO RELATED APPLICATIONS

This application represents the U.S. national stage entry of International Application No. PCT/CN2018/112462 filed Oct. 29, 2018, the disclosure of which is incorporated herein by reference in its entirety and for all purposes.

FIELD OF THE INVENTION

The invention provides a novel polyglycolide copolymer composition having high stiffness and preparation thereof, having good melting thermal stability and have a high tensile modulus at room temperature and high temperature.

BACKGROUND OF THE INVENTION

As an environmentally friendly polymer material, polyglycolide, also known as poly (glycolic acid) (PGA), is biodegradable and has attracted a lot of attention in recent years. Compared to other biodegradable plastics such as polylactic acid, polyglycolide has great advantages in tensile strength, flexural strength, flexural modulus, hardness, flexibility, heat resistance, etc. Unlike polylactic acid, polyglycolide has a high gas barrier, ideally for use in fibers, downhole tools, packaging, films, pharmaceutical carriers, medical implantable devices, underwater antifouling materials, and more.

However, the tensile modulus of traditional polyglycolide dropped dramatically at high temperatures (CN1827686B), which limits the use of polyglycolide in high temperature environments. A blend of polyglycolide and an inorganic filler has been reported (CN104684997B), but the addition of such inorganic filler also caused degradation of the polyglycolide, thereby reducing its thermal stability and mechanical properties.

There remains a need for polyglycolide or polyglycolide copolymers having good melting thermostability and high tensile modulus.

SUMMARY OF THE INVENTION

The present invention provides a composition comprising a polyglycolide or a polyglycolide copolymer and preparation thereof.

A composition is provided. The composition comprises 20-99.9 wt % of a polyglycolide or a polyglycolide copolymer and 0.1-80 wt % of a filler, based on the total weight of the composition. The composition has a tensile modulus greater than 5,800 MPa. The polyglycolide copolymer comprises one or more repeating units of $C-(A_x-B_y)_n-D$, wherein A is

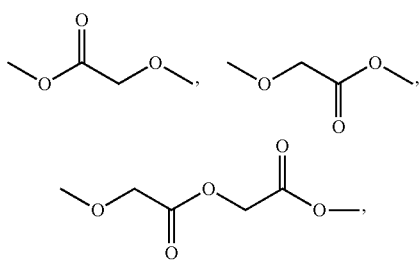

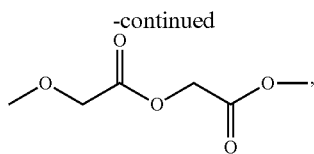

or a combination thereof; B is $G-R_1-W$; G and W are each selected from the group consisting of —CO—NH—, —CO—$R_2$—CO—OH, —CO—, —$(CH_2)_2$NH—CO—, —$CH_2$—CH(OH)—$CH_2$-and-NH; $R_1$ is an aliphatic polymer, an aromatic polymer or a combination thereof; $R_2$ is an alkyl group, an aromatic group, or an olefin group; x is between 1 and 1500; y is between 1 and 1500; n is between 1 and 10000; C and D are each a terminal group selected from the group consisting of a hydroxyl group, a carboxyl group, an amine group, an alkyl group, an aromatic group, an ether group, an alkene group, a halogenated hydrocarbon group and a combination thereof; and A and B are different in structure. The polyglycolide is prepared from glycolide by ring-opening polymerization.

The filler may be an inorganic filler selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof.

The filler may be an organic filler is selected from the group consisting of cellulose whisker, poly(butyl acrylate-styrene), poly(4-hydroxybenzyl ester), polyethylene fiber, polyester fiber, aramid fiber, poly(p-phenylene benzobisoxazole)(PBO) fiber, polyamide fiber and a combination thereof.

The composition may further comprise one or more of units of $i-R_1-j$; i and j are each selected from the group consisting of an isocyanate group (—N=C=O), an acid chloride group, an oxazolyl group, an oxazoline group, an anhydride, an epoxy group, an amine group and a combination thereof; $R_1$ is an aliphatic group, an aromatic group, or a combination thereof.

The composition may further comprise an agent selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

The glyglycolide or the polyglycolide copolymer may have a weight-average molecular weight of 10,000-1,000,000. The glyglycolide or the polyglycolide copolymer may have a ratio of a weight-average molecular weight to a number-average molecular weight (Mw/Mn) at 1.0-4.0.

The polyglycolide copolymer in the composition may be prepared according to a process comprising (a) ring-opening polymerizing glycolide in a molten state, whereby a polyglycolide is formed; and (b) extruding the polyglycolide into particles. The polyglycolide may be extruded with an additive selected from the group consisting of E, F and a combination thereof. The composition comprises the additive at 0.01-5 wt % based on the total weight of the copolymer. E may be one or more of units of $i-R_1-j$; i and j are each selected from the group consisting of an isocyanate group (—N=C=O), an acid chloride group, an oxazolyl group, an oxazoline group, an anhydride, an epoxy group, an amine group and a combination thereof; $R_1$ is an aliphatic group, an aromatic group, or a combination thereof. F may be selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

The polyglycolide copolymer in the composition may be prepared by a process comprising extruding the polyglycolide copolymer and the filler into particles. The particles may comprise 0.1-80 wt % of the filler based on the total weight of the particles.

The polyglycolide or the polyglycolide copolymer in the composition may have a melt flow rate (MFR) of 0.1-1000 g/10 min.

For each composition of the invention, a process for preparing the composition is provided. The composition comprises 20-99.9 wt % of a polyglycolide copolymer and 0.1-80 wt % of a filler, based on the total weight of the composition. The polyglycolide copolymer is prepared with a polyglycolide produced from glycolide by ring-opening polymerization. The composition has a tensile modulus greater than 5,800 MPa. The process comprises extruding and granulating a polyglycolide copolymer with a filler. The polyglycolide copolymer comprises one or more repeating units of $C-(A_x-B_y)_n-D$. A is

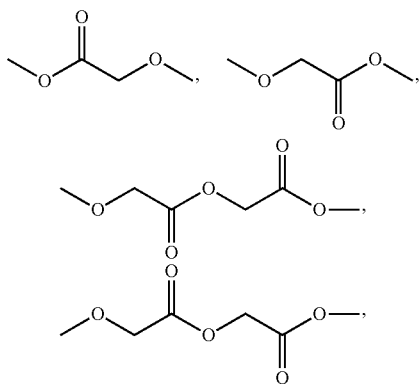

or a combination thereof; B is $G-R_1-W$; G and W are each selected from the group consisting of —CO—NH—, —CO—$R_2$—CO—OH, —CO—, —(CH$_2$)$_2$NH—CO—, —CH$_2$—CH(OH)—CH$_2$-and-NH; $R_1$ is an aliphatic polymer, an aromatic polymer or a combination thereof; $R_2$ is an alkyl group, an aromatic group, or an olefin group; x is between 1 and 1500; y is between 1 and 1500; n is between 1 and 10000; C and D are each a terminal group selected from the group consisting of a hydroxyl group, a carboxyl group, an amine group, an alkyl group, an aromatic group, an ether group, an alkene group, a halogenated hydrocarbon group and a combination thereof; and A and B are different in structure. As a result, the composition is prepared.

According to the process of the invention, the filler may be an inorganic filler selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof. The filler may be an organic filler is selected from the group consisting of cellulose whisker, poly(butyl acrylate-styrene), poly(4-hydroxybenzyl ester), polyethylene fiber, polyester fiber, aramid fiber, poly(p-phenylene benzobisoxazole) (PBO) fiber, polyamide fiber and a combination thereof.

The process may further comprise extruding and granulating the polyglycolide before extrusion and granulation of the polyglycolide with the filler.

The process may further comprise comprising extruding and granulating the polyglycolide with an additive before extrusion and granulation of the polyglycolide with the filler;

The additive may be selected from the group consisting of E, F or a combination thereof. E may be one or more of units of i-$R_1$-j, i and j are each selected from the group consisting of an isocyanate group (—N=C=O), an acid chloride group, an oxazolyl group, an oxazoline group, an anhydride, an epoxy group, an amine group and a combination thereof; $R_1$ is an aliphatic group, an aromatic group, or a combination thereof. F may be selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

The process may further comprise ring-opening polymerizing glycolide in a molten state to form the polyglycolide.

A composition prepared according to the process of the invention.

DETAILED DESCRIPTION OF THE INVENTION

The invention provides novel rigid polyglycolide or polyglycolide copolymer compositions and preparation thereof. The inventors have surprisingly discovered that, despite polyglycolide degradation in production of polyglycolide compositions by extrusion, the addition of a filler such as talc, glass fiber, carbon fiber and aramid fiber to a polyglycolide or polyglycolide copolymer in making a polyglycolide or polyglycolide copolymer compositions by extrusion improved the polymer's melting thermal stability and/or the tensile modulus at room temperature and high temperature. With improved thermal stability, hydrolytic stability, and mechanical properties, the polyglycolide or polyglycolide copolymer compositions of the present invention are suitable for diverse uses, for example, fibers, downhole tools, packaging, film, drug carriers, abrasives, medical implants, and underwater antifouling materials, etc.

The terms "polyglycolide," "poly(glycolic acid) (PGA)" and "polyglycolic acid" are used herein interchangeably and refer to a biodegradable, thermoplastic polymer composed of monomer glycolic acid. A polyglycolide may be prepared from glycolic acid by polycondensation or glycolide by ring-opening polymerization. An additive may be added to the polyglycolide to achieve a desirable property.

The term "polyglycolide copolymer" is a polymer derived from a glycolide or glycolic acid monomer and a different polymer monomer. For example, a polyglycolide copolymer may be prepared with a polyglycolide and ADR4368 (a commercial epoxy polymer of styrene and acrylic acid from BASF) by extrusion.

The term "filler" used herein refers to a compound that fills in a space in a composition comprising a polyglycolide or a polyglycolide copolymer.

A composition is provided. The composition comprises (a) a polyglycolide or a polyglycolide copolymer and (b) an inorganic or organic filler. The polyglycolide is prepared from glycolide by ring-opening polymerization. The composition may have a tensile modulus greater than about 5,000, 5,500, 5,600, 5,700, 5,800, 5,900 or 6,000 MPa.

The composition may comprise about 20-99.9 wt %, 20-99 wt %, 30-95 wt %, 40-90 wt %, 50-80 wt % or 60-70 wt % of the polyglycolide or the polyglycolide copolymer, based on the total weight of the composition.

The composition may comprise about 0.1-80 wt %, 1-70 wt %, 5-60 wt %, 10-50 wt % or 20-40 wt % of the filler, based on the total weight of the composition. The filler may be an inorganic substance. The filler may be an organic substance. The inorganic filler may be selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof. The organic filler may be selected from the group consisting of cellulose whisker, poly(butyl acrylate-styrene), poly(4-hydroxybenzyl ester), polyethylene fiber, polyester fiber, aramid fiber, One or more of poly(p-phenylene benzobisoxazole)(PBO) fiber, polyamide fiber and a combination thereof. The filler may be talc, glass fiber, carbon fiber or aramid fiber.

The composition may further comprise one or more of units of i-$R_1$-j. i and j are each selected from the group consisting of an isocyanate group (—N=C=O), an acid chloride group, an oxazolyl group, an oxazoline group, an anhydride, an epoxy group, an amine group, and a combination thereof. $R_1$ may be an aliphatic group, an aromatic group, or a combination thereof.

The composition may further comprise an agent selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

The polyglycolide copolymer may comprise one or more repeating units of C-$(A_x-B_y)_n$-D. A is selected from the group consisting of

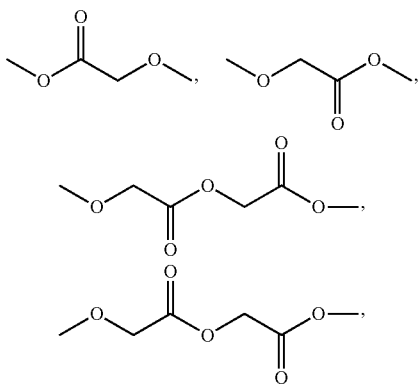

and a combination thereof. B is G-$R_1$-W, in which G and W are each selected from the group consisting of —CO—NH—, —CO—$R_2$—CO—OH, —CO—, —(CH$_2$)$_2$NH— CO—, —CH$_2$—CH(OH)—CH$_2$-and-NH; $R_1$ is an aliphatic polymer, an aromatic polymer or a combination thereof; and $R_2$ is an alkyl group, an aromatic group, or an olefin group. x is between 1 and 1500. y is between 1 and 1500. n is between 1 and 10000. C and D are each a terminal group selected from the group consisting of a hydroxyl group, a carboxyl group, an amine group, an alkyl group, an aromatic group, an ether group, an alkene group, a halogenated hydrocarbon group and a combination thereof. A and B are different in structure.

The copolymer may further comprise E. E may be one or more of units of i-$R_1$-j. i and j are each selected from the group consisting of an isocyanate group (—N=C=O), an acid chloride group, an oxazolyl group, an oxazoline group, an anhydride, an epoxy group, an amine group and a combination thereof. $R_1$ may be an aliphatic group, an aromatic group, or a combination thereof.

The copolymer may further comprise F. F may be selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

An antioxidant may be selected from the group consisting of BASF Irganox 168, 101, 245, 1024, 1076, 1098, 3114, MD 1024, 1025, ADEKA AO-60, 80, STAB PEP-36, 8T, Albemarle AT-10, 245, 330, 626, 702, 733, 816, 1135 a combination thereof.

A metal passivator may be selected from the group consisting of BASF Chel-180, Eastman OABH, Naugard XL-1, MD24, ADEKA STAB CDA-1, 6, oxalic acid derivatives, hydrazines, salicylic acid derivatives, benzotriazole and guanidine compounds, and a combination thereof.

For each copolymer of the present invention, a process for preparing the copolymer is provided. The process comprises ring-opening polymerizing glycolide in a molten state, and extruding and granulating the resulting polyglycolide. The polyglycolide may be extruded with an additive selected from the group consisting of E, F and a combination thereof. The process may further comprise feeding the polyglycolide into an extruder, into which the E and the F are added.

The ring-opening polymerization of glycolide may be a three-stage reaction.

In the first stage, glycolide may be reacted with a ring-opening polymerization catalyst at a temperature of about 60-180° C., preferably about 80-160° C., for no more than about 150 minutes, preferably not more than about 120 minutes. The glycolide may be mixed with the catalyst uniformly. This first stage may be carried out in a reactor.

The ring-opening polymerization catalyst may be a metal catalyst or a non-metal catalyst. The catalyst may be selected from the group consisting of a rare earth element, a rare earth element oxide, a metal magnesium compound, an alkali metal chelate compound (e.g., tin, antimony, or titanium), a metal ruthenium and a combination thereof. The catalyst may be about 0.01-5 wt %, preferably about 0.1-5 wt %, more preferably about 1-3 wt %, of the glycolide.

In the second stage, the mixture from the first stage may be maintained at a temperature of about 100-200° C., preferably about 120-280° C., for a time from about 0.1 minute to about 90 hours, preferably from about 1 minute to about 72 hours. This second stage may be carried out in a plug flow reactor. The plug flow reactor may be a static mixer, a twin-screw extruder, or a horizontal disk reactor. Where the plug flow reactor is a twin-screw extruder, the second stage may be carried out at about 200-300° C., preferably about 230-280° C., more preferably about 240-270° C.

In the third stage, the mixture from the second stage may be maintained at a temperature of about 150-300° C., preferably about 160-280° C., and an absolute pressure no more than about 6,000, preferably no more than about 5,000 Pa, for a time from about 0.1 minute to about 36 hours, preferably from about 1 minute to about 24 hours. As a result, a polyglycolide is prepared. The third stage may be carried out in a devolatilization reactor.

The copolymer of the present invention may comprise an additive at about 0.01-5 wt %, preferably about 0.01-3 wt %, more preferably about 0.01-1 wt %, based on the total weight of the copolymer. The additive may be selected from the group consisting of E, F and a combination thereof.

The polyglycolide or the polyglycolide copolymer may have a weight-average molecular weight of 10,000-1,000,000. The polyglycolide or the polyglycolide copolymer may have a ratio of a weight-average molecular weight to a number-average molecular weight (Mw/Mn) at about 1.0-4.0, preferably 1.1-3.0, more preferably 1.2-2.5.

The copolymer may have a melt index (MFR) of about 0.1-1000 g/10 min, preferably about 0.15-500 g/10 min, more preferably about 0.2-100 g/10 min. The MFR of a copolymer may be determined using a MFR method. The MFR method comprises drying the copolymer under vacuum at about 100-110° C. (e.g., about 105° C.); packing the dried copolymer into a rod; keeping the rod at a temperature of about 220-240° C. (e.g., about 230° C.), for about 0.5-1.5 minutes (e.g., about 1.0 minute); cutting a segment from the rod about every 15-45 seconds (e.g., about every 30 seconds); and determining a MFR of each segment based on MFR=600 W/t (g/10 min). W is the average mass of each segment. t is the cutting time gap for each segment. About 3-5 g (e.g., 4 g) of the dried copolymer may be loaded into a barrel, a plunger may be inserted into the barrel to compact the dried copolymer into the rod, and a weight of 2-3 kg (e.g., 2.16 kg) may be placed on the top of the plunger.

A thermoplastic polymer is determined in the following test: 1) drying a polymer in a vacuum drying oven at 105° C.; 2) reheating a test instrument to 230° C.; 3) loading 4 g of the dried polymer sample into a barrel through a funnel and inserting a piston into the barrel to compact the dried polymer sample in the barrel; 4) maintaining the compacted dried polymer sample in the barrel at 230° C. for 1 min, 5) placing a weight of 2.16 kg on top of the piston to press the sample through barrel, 6) cutting a segment of the pressed sample every 30 s to obtain a total of five segments; and 7) weighing the mass of each segment to calculate the MFR of the polymer as 600 times of the average mass of the segments per 10 minutes (i.e., MFR=600 W/t (g/10 min), where W is the average mass per segment of the polymer and t is the cutting time gap).

The polyglycolide or the polyglycolide copolymer in the composition may be prepared by a process comprising extruding the polyglycolide copolymer and the filler into particles. The particles may comprise 0.1-80 wt %, preferably 0.1-50 wt %, more preferably 0.1-30 wt %, of the filler, based on the total weight of the particles. The glyglycolide or the polyglycolide copolymer in the composition may have a melt flow rate (MFR) of 0.1-1000 g/10 min, preferably 0.15-500 g/10 min, more preferably 0.2-100 g/10 min.

A process for preparing a composition is provided. The composition comprises 20-99.9 wt % of a polyglycolide copolymer and 0.1-80 wt % of a filler, based on the total weight of the composition. The polyglycolide copolymer is prepared with a polyglycolide produced from glycolide by ring-opening polymerization. The composition has a tensile modulus greater than 5,800 MPa. The process comprises extruding and granulating a polyglycolide copolymer with a filler. The polyglycolide copolymer comprises one or more repeating units of C-(A$_x$-B$_y$)$_n$-D. A is

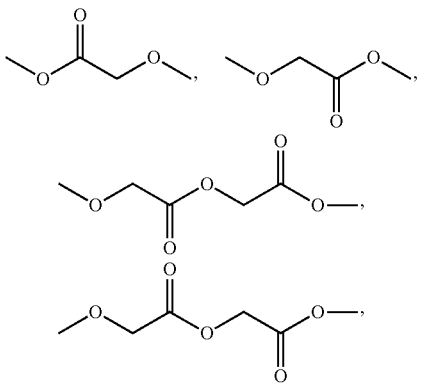

or a combination thereof; B is G-R$_1$-W; G and W are each selected from the group consisting of —CO—NH—, —CO—R$_2$—CO—OH, —CO—, —(CH$_2$)$_2$NH—CO—, —CH$_2$—CH(OH)—CH$_2$-and-NH; R$_1$ is an aliphatic polymer, an aromatic polymer or a combination thereof; R$_2$ is an alkyl group, an aromatic group, or an olefin group; x is between 1 and 1500; y is between 1 and 1500; n is between 1 and 10000; C and D are each a terminal group selected from the group consisting of a hydroxyl group, a carboxyl group, an amine group, an alkyl group, an aromatic group, an ether group, an alkene group, a halogenated hydrocarbon group and a combination thereof; and A and B are different in structure. As a result, the composition is prepared.

According to the process of the invention, the filler may be an inorganic filler selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof. The filler may be an organic filler is selected from the group consisting of cellulose whisker, poly(butyl acrylate-styrene), poly(4-hydroxybenzyl ester), polyethylene fiber, polyester fiber, aramid fiber, poly(p-phenylene benzobisoxazole) (PBO) fiber, polyamide fiber and a combination thereof.

The process may further comprise extruding and granulating the polyglycolide before extrusion and granulation of the polyglycolide with the filler.

The process may further comprise comprising extruding and granulating the polyglycolide with an additive before extrusion and granulation of the polyglycolide with the filler;

The additive may be selected from the group consisting of E, F or a combination thereof. E may be one or more of units of i-R$_1$-j, i and j are each selected from the group consisting of an isocyanate group (—N=C=O), an acid chloride group, an oxazolyl group, an oxazoline group, an anhydride, an epoxy group, an amine group and a combination thereof; R$_1$ is an aliphatic group, an aromatic group, or a combination thereof. F may be selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof.

The process may further comprise ring-opening polymerizing glycolide in a molten state to form the polyglycolide.

For each preparation process of the present invention, a composition prepared according to the process is provided.

The term "about" as used herein when referring to a measurable value such as an amount, a percentage, and the like, is meant to encompass variations of ±20% or ±10%, more preferably ±5%, even more preferably ±1%, and still more preferably ±0.1% from the specified value, as such variations are appropriate.

Example 1. Polymer Production Process

Glycolide and ring-opening polymerization catalyst tin dichloride dihydrate in an amount of 0.01 part by weight relative to the weight of the glycolide are mixed uniformly in a prefabricated tank reactor at 120° C. for 60 min.

The material in the prefabricated tank reactor is then introduced into a polymerization reactor and reacted at 200° C. for 300 min under an absolute pressure of 0.1 MPa. The polymerization reactor is a plug flow reactor, which may be a static mixer, a twin-screw extruder or a horizontal disk reactor.

The material in the polymerization reactor is then introduced into an optimization reactor at a mixing speed of 200 RPM at 220° C. and an absolute pressure of 50 Pa. The reaction time is 30 min. As a result, a polyglycolide is prepared.

Example 2. Characterization

1. Weight-Average Molecular Weight and its Distribution

A sample is dissolved in a solution of five mmol/L sodium trifluoroacetate in hexafluoroisopropanol to prepare a solution of 0.05-0.3 wt % (mass fraction). The solution is then filtered with a 0.4 μm pore size polytetrafluoroethylene filter. 20 μL of the filtered solution is added to the Gel permeation chromatography (GPC) injector for determination of molecular weight of the sample. Five standard molecular weights of methyl methacrylate with different molecular weights are used for molecular weight correction.

2. Tensile Strength Test

The tensile strength is tested according to GB/T1040 1-2006 and the tensile speed is 50 mm/min.

3. Melt Flow Rate (MFR) Test

The melt flow rate (MFR), also known as the melt flow index (MFI), of a thermoplastic polymer is determined in the following test: 1) drying a polymer in a vacuum drying oven at 105° C.; 2) reheating a test instrument to 230° C.; 3) loading 4 g of the dried polymer sample into a barrel through a funnel and inserting a piston into the barrel to compact the dried polymer sample in the barrel; 4) maintaining the compacted dried polymer sample in the barrel at 230° C. for 1 min, 5) placing a weight of 2.16 kg on top of the piston to press the sample through barrel, 6) cutting a segment of the pressed sample every 30 s to obtain a total of five segments; and 7) weighing the mass of each segment to calculate the MFR of the polymer as 600 times of the average mass of the segments per 10 minutes (i.e., MFR=600 W/t (g/10 min), where W is the average mass per segment of the polymer and t is the cutting time gap).

Example 3. Polyglycolide and Polyglycolide Copolymer Samples

Four samples, Polyglycolide 1, Polyglycolide 2, Polyglycolide Copolymer 1 and Polyglycolide Copolymer 2 were prepared with polyglycolide and one or more additives. The polyglycolide of Example 1 and additives such as 0.06 wt % Irganox 168, 0.06 wt % of Naugard XL-1, 0.1 wt % of ADR4368 and/or 0.06% STAB PEP-36, based on the total weight of the resulting sample, were placed in a twin-screw extruder and then extruded and granulated into particles at an extrusion temperature of 250° C. The particles were dried at 120° C. for 4 hours and molded into stripes for testing using an injection-molding machine at an injection temperature of 250° C. and a molding temperature of 100° C. Table 1 shows the composition and testing results of these four samples.

TABLE 1

Polymer Synthesis Parameters and Performance Results

| | Sample | | | |
| --- | --- | --- | --- | --- |
| | Polyglycolide 1 | Polyglycolide 2 | Polyglycolide Copolymer 1 | Polyglycolide Copolymer 2 |
| Polyglycolide (wt %) | 99.94 | 99.88 | 99.78 | 99.78 |
| Irganox 168 (wt %) | 0.06 | 0.06 | 0.06 | |
| STAB PEP-36 (wt %) | | | | 0.06 |
| Naugard XL-1 (wt %) | | 0.06 | 0.06 | 0.06 |
| ADR4368 (wt %) | | | 0.1 | 0.1 |
| MFR (g/10 min) | 37 | 19 | 10 | 9 |
| Mw (g/mol) | 125700 | 153000 | 169800 | 170000 |

In general, polyglycolide degrades even after being processed by extrusion. The MFR of particles after granulation by extrusion reflects the melting thermal stability of the polymer. The higher the MFR of the particles is after granulation, the worse the melting thermal stability of the polymer is. Based on the comparison of Polyglycolide 1 with Polyglycolide 2, the addition of metal passivator Naugard XL-1 lowered the MFR value, indicating improvement of the melting thermal stability. Based on the comparison of Polyglycolide Copolymers 1 and 2 with Polyglycolide 2, the addition of structural modifier further lowered the MFR value, indicating further improvement of the melting thermal stability.

Example 4. Polyglycolide or Polyglycolide Copolymer Compositions

Nine compositions comprising different amounts of the polyglycolide or polyglycolide copolymer of Example 3 with different amounts of inorganic fillers. Polyglycolide 1, Polyglycolide 2, Polyglycolide Copolymer 1 of Polyglycolide Copolymer 2, optionally with a filler such as 10 wt % talc, 10 or 30 wt % glass fiber, 25 wt % carbon fiber, 10 wt % aramid fiber (TWARON fiber), based on the total weight of the resulting composition, was placed in a twin-screw extruder and then extruded for granulation into particles at an extrusion temperature of 250° C. The particles were dried at 120° C. for 4 hours and molded into stripes for testing using an injection-molding machine at an injection temperature of 250° C. and a molding temperature of 100° C. Table 2 shows the composition and the testing results of these particle compositions.

In general, it is inevitable that polyglycolide has some degradation during a second extrusion. It shows in Table 2 that, the MFR of Composition 1, which contains 100 wt % of Polyglycolide 1 increased from 37 to 97 g/min, while the MFR of Composition 2 increased from 1 to 68 g/min. Based on the comparison of Compositions 3-7 to Composition 2, addition of a filler such as talc, glass fiber, carbon fiber, and aramid fiber improved significantly the tensile modulus at 23° C. and 150° C. Composition 5, which has 30 wt % of the glass fiber and Composition 6, which has 25 wt % of the carbon fiber showed the most obvious tensile modulus improvement.

Adding an inorganic filler to a polyglycolide will cause degradation of the polyglycolide. Based on the comparison of Compositions 5 and 8, because of the use of Polyglycolide Copolymer 1, which has Naugard XL-1 and ADR4368, Compositions 5 had lowered MFR, indicating improved melting thermal stability and reduced degradation. Moreover, the addition of Naugard XL-1 and ADR4368 in Polyglycolide Copolymer 1, significantly increased the tensile modulus of Composition 5 at 23° C. and 150° C. Based on the results of Compositions 5 and 9, the use of antioxidant STAB PEP-36 in Composition 9 instead of Irganox 168 in Composition 5 can also have lower MFR and increased tensile modulus.

Although the invention is illustrated and described herein with reference to specific embodiments, the invention is not intended to be limited to the details shown. Rather, various modifications may be made in the details within the scope and range of equivalents of the claims without departing from the invention.

TABLE 2

Composition compositions and testing Results

| Composition | 1 | 2 | 3 | 4 | 5 | 6 | 7 | 8 | 9 |
|---|---|---|---|---|---|---|---|---|---|
| Polyglycolide 1 (wt %) | 100 | | | | | | | 70 | |
| Polyglycolide 2 (wt %) | | | | | | | | | |
| Polyglycolide Copolymer 1 (wt %) | | 100 | 90 | 90 | 70 | 75 | 90 | | |
| Polyglycolide Copolymer 2 (wt %) | | | | | | | | | 70 |
| Talc (wt %) | | | 10 | | | | | | |
| Glass fiber (wt %) | | | | 10 | 30 | | | 30 | 30 |
| Carbon fiber (wt %) | | | | | | 25 | | | |
| Aramid fiber (wt %) | | | | | | | 10 | | |
| MFR (g/10 min) | 97 | 68 | 81 | 67 | 31 | 42 | 55 | 89 | 66 |
| Tensile modulus @ 23 C. (MPa) | 5988 | 6077 | 6590 | 7010 | 8797 | 12105 | 6751 | 8520 | 8737 |
| Tensile stress @ 23 C. (MPa) | 114 | 113 | 121 | 130 | 158 | 204 | 128 | 150 | 155 |
| Tensile enlongation @ 23 C. (MPa) | 10.1 | 16 | 8.7 | 5.9 | 3.2 | 2.9 | 11.1 | 3 | 3.1 |
| Tensile modulus @ 150 C. (MPa) | 479 | 510 | 620 | 3520 | 4499 | 6553 | 3397 | 4170 | 4291 |
| Tensile stress @ 150 C. (MPa) | 24 | 25 | 31 | 69 | 74 | 79 | 65 | 69 | 71 |
| Tensile enlongation @ 150 C. (MPa) | unbroken | unbroken | 105 | 20 | 4.1 | 2 | 35 | 3.7 | 4 |

What is claimed:

1. A composition comprising 20-99.9 wt % of a polyglycolide or a polyglycolide copolymer and 0.1-80 wt % of a filler, based on the total weight of the composition, wherein the composition has a tensile modulus greater than 5,800 MPa, wherein the polyglycolide copolymer comprises one or more repeating units of $C-(A_x-B_y)_n-D$, wherein:

A is

[chemical structures]

or a combination thereof;
B is $G-R_1-W$;
G and W are each selected from the group consisting of —CO—NH—, —CO—$R_2$—CO—OH, —CO—, —(CH$_2$)$_2$NH—CO—, —CH$_2$—CH(OH)—CH$_2$-and-NH;
$R_1$ is an aliphatic polymer, an aromatic polymer or a combination thereof;
$R_2$ is an alkyl group, an aromatic group, or an olefin group;
x is between 1 and 1500;
y is between 1 and 1500;
n is between 1 and 10000;
C and D are each a terminal group selected from the group consisting of a hydroxyl group, a carboxyl group, an amine group, an alkyl group, an aromatic group, an ether group, an alkene group, a halogenated hydrocarbon group and a combination thereof;
A and B are different in structure; and
wherein the polyglycolide copolymer is prepared with a polyglycolide from glycolide by ring-opening polymerization;
the composition further comprising an additive selected from the group consisting of E, F and a combination thereof,
wherein E is one or more of units of $i-R_1-j$, i and j are each selected from the group consisting of an isocyanate group (—N=C=O), an acid chloride group, an oxazolyl group, an oxazoline group, an anhydride, an epoxy group, an amine group and a combination thereof; $R_1$ is an aliphatic group, an aromatic group, or a combination thereof; and
wherein F is selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof;
when the composition is prepared by extruding and granulating the polyglycolide with an additive before extrusion and granulation of the polyglycolide or the polyglycolide copolymer with the filler.

2. The composition of claim 1, wherein the filler is an inorganic filler selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof.

3. The composition of claim 1, wherein the filler is an organic filler is selected from the group consisting of cellulose whisker, poly(butyl acrylate-styrene), poly(4-hydroxybenzyl ester), polyethylene fiber, polyester fiber, aramid fiber, poly(p-phenylene benzobisoxazole)(PBO) fiber, polyamide fiber and a combination thereof.

4. The composition of claim 1, wherein the polyglycolide copolymer has a weight-average molecular weight of 10,000-1,000,000.

5. The composition of claim 1, wherein the polyglycolide copolymer has a ratio of a weight-average molecular weight to a number-average molecular weight (Mw/Mn) at 1.0-4.0.

6. The composition of claim 1, wherein the polyglycolide copolymer has a melt flow rate (MFR) of 0.1-1000 g/10 min.

7. A process for preparing a composition, wherein the composition comprises 20-99.9 wt % of a polyglycolide or polyglycolide copolymer and 0.1-80 wt % of a filler, based on the total weight of the composition, wherein the polyglycolide copolymer is prepared with a polyglycolide produced from glycolide by ring-opening polymerization, wherein the composition has a tensile modulus greater than 5,800 MPa, the process comprising extruding and granulating a polyglycolide copolymer with a filler, wherein the polyglycolide copolymer comprises one or more repeating units of $C-(A_x-B_y)_n-D$, wherein:

A is

[chemical structures]

or a combination thereof;
B is $G-R_1-W$;
G and W are each selected from the group consisting of —CO—NH—, —CO—$R_2$—CO—OH, —CO—, —(CH$_2$)$_2$NH—CO—, —CH$_2$—CH(OH)—CH$_2$-and-NH;
$R_1$ is an aliphatic polymer, an aromatic polymer or a combination thereof;
$R_2$ is an alkyl group, an aromatic group, or an olefin group;
x is between 1 and 1500;
y is between 1 and 1500;

n is between 1 and 10000;

C and D are each a terminal group selected from the group consisting of a hydroxyl group, a carboxyl group, an amine group, an alkyl group, an aromatic group, an ether group, an alkene group, a halogenated hydrocarbon group and a combination thereof; and A and B are different in structure;

wherein the process further comprising extruding and granulating the polyglycolide with an additive before extrusion and granulation of the polyglycolide or the polyglycolide copolymer with the filler;

wherein the additive is selected from the group consisting of E, F and a combination thereof;

wherein E is one or more of units of i-$R_1$-j, i and j are each selected from the group consisting of an isocyanate group (—N═C═O), an acid chloride group, an oxazolyl group, an oxazoline group, an anhydride, an epoxy group, an amine group and a combination thereof; $R_1$ is an aliphatic group, an aromatic group, or a combination thereof; and wherein F is selected from the group consisting of an antioxidant, a metal passivator, an end capping agent, a nucleating agent, an acid scavenger, a heat stabilizer, a UV stabilizer, a lubricant plasticizer, a crosslinking agent, and a combination thereof;

whereby the composition is prepared.

8. The process of claim 7, wherein the filler is an inorganic filler selected from the group consisting of glass fiber, glass beads, talc, calcium carbonate, nano-clay, hydrotalcite, carbon black, carbon fiber, carbon nanotube, graphene, titanium dioxide, silicon dioxide, montmorillon Soil, steel fiber, hemp fiber, bamboo fiber, wood fiber, wood powder, wood chip, alumina, magnesia, zinc oxide, aluminum nitride, boron nitride, silicon carbide, graphite, silicon carbide, potassium titanate, aluminum borate, calcium sulfate, magnesium sulfate, ceramic whiskers, inorganic salt whiskers, metal whiskers and a combination thereof.

9. The process of claim 7, wherein the filler is an organic filler is selected from the group consisting of cellulose whisker, poly(butyl acrylate-styrene), poly(4-hydroxybenzyl ester), polyethylene fiber, polyester fiber, aramid fiber, poly(p-phenylene benzobisoxazole)(PBO) fiber, polyamide fiber and a combination thereof.

10. The process of claim 7, further comprising ring-opening polymerizing glycolide in a molten state to form the polyglycolide.

11. A composition prepared according to the process of claim 7.

12. The composition of claim 1, wherein the additive is selected from a combination of E and F, and the polyglycolide copolymer comprises 0.01-5 wt % of the additive, based on the total weight of the polyglycolide copolymer.

13. The composition of claim 12, wherein i and j of E are each an epoxy group, and F is a combination of an antioxidant and a metal passivator.

14. The composition of claim 13, wherein the polyglycolide copolymer comprises 0.1 wt % of an epoxy polymer of styrene and acrylic acid, 0.06 wt % of an antioxidant, and 0.06 wt % of a metal passivator, based on the total weight of the polyglycolide copolymer.

15. The composition of claim 14, wherein the epoxy polymer of styrene and acrylic acid is ADR4368, the antioxidant is Irganox168 or STAB PEP-36, and the metal passivator is Naugard XL-1.

16. The process of claim 7, wherein the additive is selected from a combination of E and F, and the polyglycolide copolymer comprises 0.01-5 wt % of the additive, based on the total weight of the polyglycolide copolymer.

17. The process of claim 16, wherein i and j of E are each an epoxy group, and F is a combination of an antioxidant and a metal passivator.

18. The process of claim 17, wherein the polyglycolide copolymer comprises 0.1 wt % of an epoxy polymer of styrene and acrylic acid, 0.06 wt % of an antioxidant, and 0.06 wt % of a metal passivator, based on the total weight of the polyglycolide copolymer.

19. The process of claim 18, wherein the epoxy polymer of styrene and acrylic acid is ADR4368, the antioxidant is Irganox 168 or STAB PEP-36, and the metal passivator is Naugard XL-1.

* * * * *